US006737370B2

(12) United States Patent
Espe

(10) Patent No.: US 6,737,370 B2
(45) Date of Patent: May 18, 2004

(54) PRESS PAD CONTAINING FLUOROELASTOMER OR FLUOROSILICONE ELASTOMER PRIORITY CLAIM

(75) Inventor: Rolf Espe, Bochum (DE)

(73) Assignee: Rheinische Filztuchfabrik GmbH, Stolberg (DE)

(*) Notice: Subject to any disclaimer, the term of this patent is extended or adjusted under 35 U.S.C. 154(b) by 18 days.

(21) Appl. No.: 09/810,283

(22) Filed: Mar. 16, 2001

(65) Prior Publication Data

US 2001/0029139 A1 Oct. 11, 2001

(30) Foreign Application Priority Data

Mar. 21, 2000 (DE) .................................... 200 05 255 U
May 11, 2000 (DE) .................................... 200 08 249 U

(51) Int. Cl.[7] ........................ D03D 15/08; D03D 15/00; B32B 15/14

(52) U.S. Cl. ....................... 442/200; 442/228; 442/229; 442/238

(58) Field of Search ................................ 442/228, 229, 442/238, 200, 187, 60, 64, 246, 189

(56) References Cited

U.S. PATENT DOCUMENTS

| | | | | | |
|---|---|---|---|---|---|
| 4,265,972 | A | | 5/1981 | Rudner | |
| 4,603,175 | A | * | 7/1986 | Kawachi et al. | 525/276 |
| 4,985,483 | A | * | 1/1991 | Saito et al. | 524/265 |
| 5,855,733 | A | | 1/1999 | Douglas et al. | |
| 6,342,457 | B1 | | 1/2002 | Best et al. | |

FOREIGN PATENT DOCUMENTS

| | | | | |
|---|---|---|---|---|
| AU | B-34596/95 | | | 5/1996 |
| DE | 2338749 | | | 2/1975 |
| DE | G9017587.5 | | | 3/1991 |
| DE | 29619737 | U1 | | 2/1997 |
| DE | 862988 | A | * | 3/1997 |
| DE | 19709644 | | | 9/1998 |
| EP | 0713762 | | | 5/1996 |
| EP | 0735949 | | | 10/1996 |
| EP | 862988 | | * | 3/1997 |
| EP | 0978528 | | | 2/2000 |
| EP | 1040909 | | | 10/2000 |
| EP | 1040910 | | | 10/2000 |
| WO | WO 96/13376 | | * | 5/1996 |
| WO | WO98/50214 | | | 11/1998 |

* cited by examiner

*Primary Examiner*—Cheryl A. Juska
*Assistant Examiner*—Lynda Salvatore
(74) *Attorney, Agent, or Firm*—W. F. Fasse; W. G. Fasse

(57) ABSTRACT

A press pad for use in hot laminating presses includes a woven fabric of warp threads and weft threads. At least some of the threads include at least one elastomer selected from among fluoroelastomers, fluorosilicone elastomers, blend elastomers prepared by copolymerizing a mixture of raw crude silicone and fluorosilicone rubbers, and blend elastomers prepared by copolymerizing a mixture of raw crude silicone and fluorinated rubbers. The overall woven fabric contains a substantial proportion, such as at least 10% or more, of the selected elastomer. The selected elastomer is preferably applied as a coating or sheath over a multi-strand core of copper, brass, high-grade alloy steel or stainless steel strands to form the weft threads. The press pad has good elastomeric resilience, excellent temperature resistance for constant duty use above 250° C., and excellent chemical resistance.

20 Claims, 1 Drawing Sheet

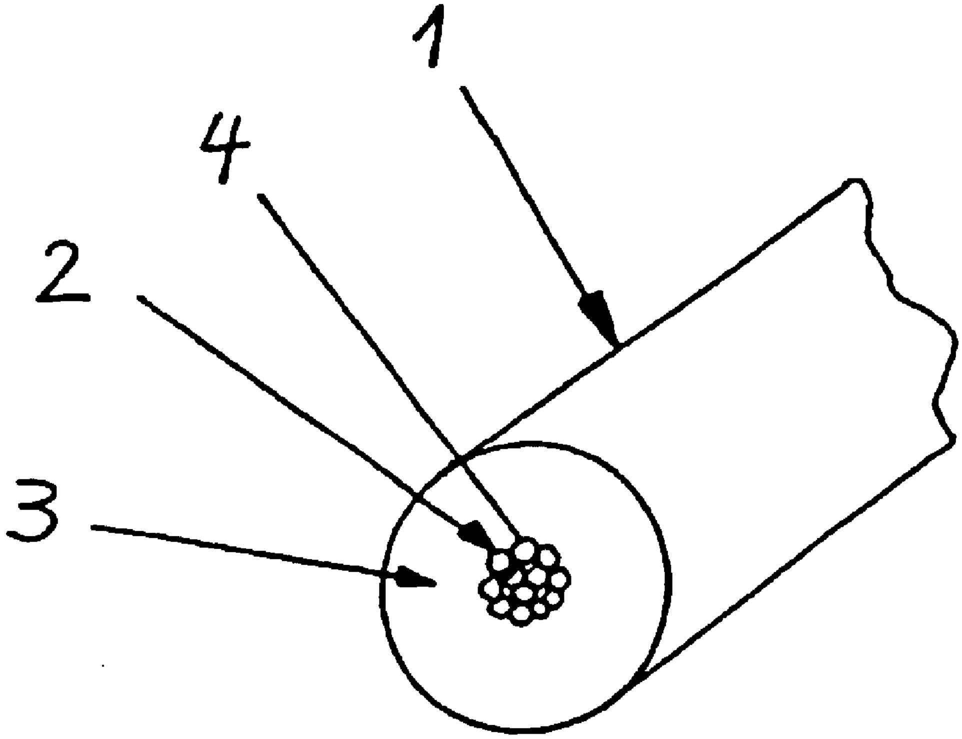
1
4
2
3

PRESS PAD CONTAINING FLUOROELASTOMER OR FLUOROSILICONE ELASTOMER PRIORITY CLAIM

FIELD OF THE INVENTION

The invention relates to a press pad for use in single daylight or multi-daylight, i.e. single layer or multi-layer, hot presses. The press pad comprises a woven fabric containing elastomer material.

BACKGROUND INFORMATION

It is conventionally known to use press pads of the above mentioned general type in various types of high pressure and low pressure presses, for example short cycle presses and multi-daylight or multi-layer presses for pressing and laminating melamine sheets or the like onto wood fiberboard or plywood or the like, or high pressure presses for manufacturing high pressure laminates, and various other types of presses for many different uses in many different fields. Since the sheet work-pieces to be pressed or laminated, as well as the components of the above mentioned presses themselves generally have tolerances of their dimensions and the like, the press pads serve the purpose of compensating these tolerances and transmitting the pressing forces uniformly over the entire surface of the sheet goods workpiece that is to be pressed. Simultaneously, the press pads serve to uniformly distribute and transmit the heat from the hot press platen to the sheet goods workpiece.

Typical press pads are conventionally constructed in the form of a single layer or multi-layer arrangement of woven fabric, web or mesh. In view of the above described requirements and functions of the press pad, namely achieving a uniform temperature distribution and pressing force distribution while compensating any tolerances, the woven fabric of the press pad generally comprises or consists of materials that are suitable for use at temperatures up to above 200° C., while possessing the largest possible thermal conductivity together with the greatest possible elastic resilience and spring-back or recovery under intermittent pressure loading.

A conventional press pad of the above described type is known from German Utility Model DE 90 17 587 U1 for example. That conventional press pad comprises a flexible press pad woven fabric made of a yarn of aromatic polyamides, which may be mixed with other yarn materials as required. Furthermore, the woven textile fabric of the press pad shall contain metal threads in an amount between 0 and 70 wt. % relative to the total weight of the press pad, in order to adjust the thermal conductivity of the press pad to the required value.

European Patent Publication EP 0,713,762 A2 discloses another conventional press pad for high pressure and lower pressure presses, whereby the press pad is made of the following components.

Group 1:

1.1 yarn made of aromatic polyamide, which may be mixed with other yarn materials as required and contains metal threads in any desired proportions, 1.2 metal yarn.

Group 2:

2.1 heat resistant filament made of rubber or a rubber mixture, 2.2 heat resistant filament made of silicone or a silicone mixture, 2.3 heat resistant elastic synthetic plastic filament, 2.4 material of the groups 2.1, 2.2 and/or 2.3 with a metal core, whereby this metal core does not have to be fixedly connected with the material that surrounds it, 2.5 material of at least one of the groups 2.1 to 2.4, surrounded by metal threads, 2.6 yarn of the group 1.1, but without metal threads.

A further conventional press pad is known from the published European Patent Specification EP 0,735,949 B1, in which the press pad comprises a woven textile web or fabric with weft threads and warp threads, whereby the warp threads and/or the weft threads comprise a silicone elastomer. For example, the silicone elastomer may be woven into the fabric in the form of solid threads, or in the form of metal wires that are respectively encased or sheathed with silicone elastomer.

In the pressing art, there is a constant trend toward achieving shorter pressing times, which necessarily involve the use of higher press platen temperatures of the pressing equipment. For this reason, the demands placed on the press pads used in such presses have recently been increasing steadily. In this context it has been found that the conventionally known press pads suffer limitations and inadequacies in view of the shorter pressing cycles and higher pressing temperatures. For example, one disadvantage of the previously known press pads is that they have an inadequate chemical resistance, for example with respect to hydraulic oil. Thus, in the event of any hydraulic oil leaking out of a hydraulic press into the woven web of the press pad, the press pad suffers a rapid breakdown or degradation, with a consequent loss of its mechanical properties. Particularly, the above mentioned silicone elastomers or polyamides used in the conventional press pads have an inadequate or non-existent chemical resistance with respect to hot oils, gasoline and other petroleum products, aliphatic and aromatic olefins, chlorinated hydrocarbons, and acids, for example.

Moreover, further problems arise due to the high pressing temperatures and reactions during the pressing process. For example, in connection with the polycondensation of aminoplast resins in the pressing equipment, chemical fission products are generated and penetrate into the woven web of the press pads. These chemical fission byproducts can chemically attack or degrade the material of conventional press pads. Moreover, the conventional press pads subjected to a relatively high continuous duty temperature of 100 to 250° C. become embrittled rather quickly, or become oxidized or hydrolized, whereby the press pads lose their mechanical properties and no longer provide the required pad characteristics.

SUMMARY OF THE INVENTION

In view of the above, it is an object of the invention to provide a press pad that will better meet the requirements and demands in present day technical innovations in various pressing applications. Particularly, the invention aims to provide a press pad that has a high temperature resistance for constant duty use at temperatures over 250° C., and a chemical resistance against hot oils, gasoline and other petroleum products, aliphatic and aromatic olefins, chlorinated hydrocarbons, and acids. Furthermore, the inventive press pad shall provide a high flexibility and resilient elastic recovery characteristic of the woven web material. The invention further aims to avoid or overcome the disadvantages of the prior art, and to achieve additional advantages, as apparent from the present specification.

The above objects have been achieved according to the invention in a press pad comprising a woven fabric that contains a substantial proportion of an elastomer selected from the group consisting of fluoroelastomers, fluorosilicone elastomers, blend elastomers prepared by crosslinking a mixture of a raw crude silicone rubber and a raw crude fluorosilicone rubber, and blend elastomers prepared by crosslinking a mixture of a raw crude silicone rubber and a raw crude fluorinated rubber.

Throughout this specification, the term "woven fabric" refers to any woven material such as a woven textile, web, mesh, screen, etc. The weave may be a two-dimensional weave or a three-dimensional weave among several woven layers. The term "elastomer" refers to a solid polymer material that is at least partially crosslinked or vulcanized and that exhibits rubbery elastic extensibility and restoring characteristics, while the term "raw crude rubber" refers to a viscous liquid or semisolid starting material that has little defined resiliency and practically no defined strength, but that forms an elastomer when crosslinked. Generally, the raw crude rubber is the starting material, which is crosslinked to form an elastomer. This starting material of raw crude rubber has also been known in connection with the terms "caoutchouc", "gum resin", and the like.

Elastomers significant in this application are also to be distinguished from non-elastomeric thermoplastic polymers or compounds. In this regard, thermoplastics are linear or branched, non-crosslinked polymers that may be repeatedly melted, flowed and reformed (e.g. by various molding techniques) upon being sufficiently heated (either above a distinct melting temperature transition or above a melting temperature range or zone), and then re-solidified upon cooling. The useful temperature range of application of a thermoplastic must thus be limited to below the melting temperature. The residual tensile strain of thermoplastics is greater than 50%. Representative non-elastomeric thermoplastics include polytetrafluoroethylene (PTFE) e.g. TEFLON (TM), ethylenetetrafluoroethylene (ETFE), perfluoroalkoxy copolymer (PFA), polychlorotrifluoroethylene (PCTFE), ethylenechlorotrifluoroethylene (ECTFE), polyvinylfluoride (PVF), polyvinylidenefluoride (PVDF), tetrafluoroethylene-hexafluoropropylene copolymer (FEP), etc.

On the other hand, elastomers are understood to be crosslinked (or vulcanized) polymeric materials that have substantial extensibility. For example, an elastomer can be stretched at room temperature to at least twice its original length and, upon immediate release of the stress, will quickly return to approximately its original length. The residual tensile strain of elastomers is significantly less than 50%, and typically around 2% or less. The rubbery elastic properties are maintained over a broad temperature range above and below normal room temperature. Due to the crosslinking, elastomers cannot be repeatedly re-melted, re-formed and re-solidified as can the thermoplastics discussed above. Elastomers are formed typically by crosslinking a natural or synthetic raw crude rubber.

The inventive limitation of a "substantial proportion" of the selected elastomer in the woven fabric refers to a proportion of the selected elastomer that is adequate to provide the required chemical and thermal resistance, together with the required elastic resiliency. In different end use applications, a different amount or proportion of the selected inventive elastomer will be required, depending on the type and extent of chemical aggressive attack and the temperatures to which the press pad will be subjected. The proportion of the selected elastomer may be represented as a weight percentage relative to the total weight of the press pad. In typical applications intended for the press pad, the substantial proportion of the selected elastomer is at least 70%, or preferably higher, for example at least 30% or at least 50% or at least 60%, or any numerical value in this range. In view of the relatively high cost of the selected inventive elastomers, the proportional content thereof should not be made unnecessarily high, but should be selected to achieve the required characteristics in each case. On the other hand, the higher proportional content of the selected inventive elastomer will provide better properties, so the cost must be balanced with the required characteristics.

According to a first embodiment of the invention, the selected elastomer is a fluoroelastomer, or an elastomer prepared from a raw crude fluorinated rubber. Such fluoroelastomers are characterized by an excellent thermal resistance to withstand temperatures over 250° C. on a constant duty basis. Thus, the inventive press pad containing a substantial proportion of such a fluoroelastomer is also suitable for use in a press carrying out the shortest pressing cycle times with correspondingly high platen temperatures. Moreover, fluoroelastomers have a very good chemical resistance, for example with respect to hot oils, gasoline and other petroleum products, aliphatic and aromatic olefins, fluorinated hydrocarbons, and acids, to which fluoroelastomers are absolutely resistant. Fluoroelastomers are further characterized by their high elasticity, even at high constant temperatures of over 250° C. For this reason, the inventive press pad according to the first embodiment can be used under the most severe application conditions with a considerably longer service life than the conventionally known press pad types.

A preferred fluoroelastomer for use in the press pad according to the invention is an elastomer prepared by co-polymerization or terpolymerization of vinyl chloride with one or more of hexafluoropropylene (HFP), tetrafluoroethylene (TFE), 1-hydropentafluoropropylene (HFPE) or perfluoromethylvinylether (FMVE).

The selected fluoroelastomer can be used or incorporated in the woven fabric of the press pad in various manners. For example, a metal mesh of woven metal threads or wires can first be prepared, and then the fluoroelastomer can be applied onto this metal mesh. Alternatively, a particularly advantageous and preferred embodiment is that the warp threads and/or the weft threads of the woven fabric themselves contain a substantial proportion of the selected fluoroelastomer. In this context, either all of the warp threads and/or the weft threads can contain, or be coated with, or essentially consist of the selected fluoroelastomer, or alternatively only a portion of the warp and/or weft threads may include the fluoroelastomer.

According to a second embodiment of the invention, the press pad, and particularly the woven fabric of the press pad, comprises a substantial proportion of a fluorosilicone elastomer. The basic molecular structure of a pure raw crude silicone rubber is as follows:

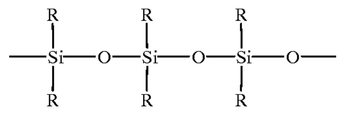

wherein R represents an organo group and especially a methyl group. The above structural formula can be represented by the following summarized or summation formula:

$$-[R_2SiO]_n-.$$

The use of such a raw crude silicone rubber in a press pad is known in the prior art. By crosslinking such a raw crude silicone rubber with a suitable crosslinking agent, the result is a silicone elastomer. Such a silicone elastomer is also generally known as a silicone rubber or particularly a vulcanized silicone rubber.

The inventive fluorosilicone elastomer is distinguished from the above described raw crude silicone rubber or silicone elastomer in that some of the methyl groups attached to the siloxane of the basic molecule of the raw crude silicone rubber have been replaced by trifluoroalkyl groups. For example, if the trifluoroalkyl group comprises a trifluoromethyl group, then the resulting fluorosilicone elastomer will have the following structural formula:

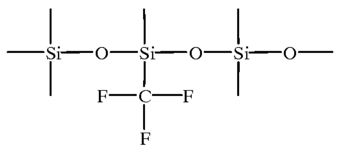

Fluorosilicone elastomers are distinguished from conventional silicone elastomers not only by their significantly different molecular structure and entirely different production methods, but also by considerably different chemical and physical characteristics that result from the different chemical structure. Generally, it could be said that the fluorosilicone elastomers combine the best characteristics of silicone elastomers with the best characteristics of the fluorocarbons or fluoroelastomers. For example, just like the above mentioned fluoroelastomers of the first embodiment, the present fluorosilicone elastomers have an excellent thermal resistance to temperatures over 250° C. The fluorosilicone elastomers also have a very good chemical resistance with respect to hot oils, gasoline and other petroleum products, aliphatic and aromatic olefins, fluorinated hydrocarbons and acids. While the fluorosilicone elastomers may not be absolutely resistant like the above mentioned fluoroelastomers against these chemical media, they are extremely resistant nonetheless. In comparison to the fluoroelastomers, which do not contain any silicon atoms, the present inventive fluorosilicone elastomers have a higher elasticity and a better resilient elastic recovery characteristic.

The fluorosilicone elastomer according to the invention may be contained or incorporated in the woven fabric of the press pad in the same manners as described above in connection with the fluoroelastomer.

The fluorosilicone elastomer may be provided in the press pad in its pure form, or the press pad may contain a blend elastomer prepared by crosslinking a mixture of a raw crude silicone rubber and a raw crude fluorosilicone rubber, or by crosslinking a mixture of a raw crude silicone rubber and a raw crude fluorinated rubber. By varying the proportions of the raw crude silicone rubber, the raw crude fluorinated rubber, and/or the raw crude fluorosilicone rubber, the resulting characteristics of the crosslinked elastomer and thereby the resulting characteristics of the press pad can be individually adjusted or selected to meet the requirements of any particular application.

The proportion of the fluorosilicone elastomer in such a blend elastomer should preferably amount to more than 10 wt. % or even at least 20 wt. % of the resulting blend. By using such a blend elastomer, the material costs for producing the press pad according to the invention can be significantly reduced if required. Nonetheless, using such a blend elastomer will still achieve a significant improvement of the relevant chemical and physical characteristics of the elastomer for use in a press pad in comparison to using pure silicone elastomers.

In order to improve its thermal conductivity characteristics, the press pad according to the invention may further include at least a proportion of metal in the warp threads and/or the weft threads. One alternative to provide such a metal proportion is to mix a metal powder into the elastomeric material, such as the fluoroelastomer or the fluorosilicone elastomer or the blend elastomer according to the invention. As another alternative, metal threads may be provided as a component or as the entire composition of some or all of the warp threads and/or the weft threads.

In a particularly advantageous or preferred embodiment of the inventive press pad, the warp threads and/or the weft threads respectively comprise a thread core of a high strength, temperature resistant yarn material, and a thread coating or sheath of a fluoroelastomer, a fluorosilicone elastomer, or a blend elastomer according to the invention. While it is possible to provide solid threads that essentially consists of the selected elastomer according to the invention, the weaving processing is considerably simplified if the respective threads comprise a coating or sheath of the selected elastic fluoroelastomer, fluorosilicone elastomer, or blend elastomer, over a thread core that has a considerably higher modulus of elasticity than the elastomeric coating or sheath.

According to a further particular embodiment, the thread core may essentially consist of metal, in the form of a single metal wire, or preferably a plurality of individual metal filaments or strands which are bundled or twisted together to form a stranded core. Due to the good thermal conductivity of copper and its alloys, and due to the high resistance of high-grade alloy steel or stainless steel, the thread core advantageously consists of a bundle of strands of copper, brass, high-grade alloy steel, or stainless steel.

BRIEF DESCRIPTION OF THE DRAWINGS

In order that the invention may be clearly understood, it will now be described in connection with example embodiments, with reference to the accompanying single drawing FIGURE, which shows a cross-section through a weft thread of the woven fabric of a press pad according to the invention.

DETAILED DESCRIPTION OF PREFERRED EXAMPLE EMBODIMENTS AND OF THE BEST MODE OF THE INVENTION

A press pad according to the invention comprises one or more layers of a woven fabric comprising interwoven warp threads and weft threads. Either the warp threads or the weft threads, or both, may contain at least a substantial or essential proportion of the selected elastomer according to the invention. The single drawing FIGURE shows a representative weft thread 1 which comprises a thread core 2 completely surrounded by a thread coating or sheath 3. The thread core 2 is a multi-strand made up of a plurality of individual thin copper strands or wires 4, which may be twisted together. The thread coating or sheath 3 consists of the selected elastomer according to the invention. Namely, according to the first embodiment, the thread coating or sheath 3 consists of a fluoroelastomer, for example prepared by copolymerizing a hexafluoropropylene with a vinyl chloride. In the second embodiment, the thread coating or sheath 3 consists of a fluorosilicone elastomer. According to the further alternative embodiments of the invention, the thread coating or sheath 3 consists of the selected blend elastomer.

In any event, the coating 3 may be applied onto the core 2 by dipping, die extrusion, spraying, or any other known manner of coating a wire or the like.

In addition to a plurality of the above described weft threads 1, the inventive press pad comprises a plurality of warp threads, which are preferably multi-strand threads of brass or copper strands. These warp threads are interwoven with the weft threads 1 in any known weaving technique, to form a two-dimensional or three-dimensional woven fabric for the press pad. Such a press pad has excellent thermal resistance and durability, and chemical resistance against essentially all of the chemical compounds that typically arise in the use of such a press pad in pressing equipment. Moreover, the press pad has very good padding and elasticity characteristics. Depending on the particular requirements of the application at hand, other yarns or other threads can be combined with the above described materials for the weft threads and/or the warp threads to achieve or adjust the resulting characteristics required for the press pad.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A press pad adapted for use in high temperature pressing equipment, comprising a woven fabric that includes an amount of at least one crosslinked elastomer comprising at least one of first blend elastomers prepared by crosslinking a mixture of a raw crude silicone rubber and a raw crude fluorosilicone rubber, and second blend elastomers prepared by crosslinking a mixture of a raw crude silicone rubber and a raw crude fluorinated rubber, wherein said amount is at least 10 weight percent of a total weight of said press pad.

2. The press pad according to claim 1, wherein said at least one crosslinked elastomer further comprises at least one fluoroelastomer.

3. The press pad according to claim 2, wherein said at least one fluoroelastomer is an elastomer produced by a copolymerization of vinyl chloride with at least one of hexafluoropropylene, tetrafluoroethylene, 1-hydropentafluoropropylene, and perfluoromethylvinylether.

4. The press pad according to claim 3, wherein said at least one fluoroelastomer is an elastomer produced by terpolymerization of vinyl chloride with two of hexafluoropropylene, tetrafluoroethylene, 1-hydropentafluoropropylene, and perfluoromethylvinylether.

5. The press pad according to claim 1, wherein said at least one crosslinked elastomer further a comprises at least one fluorosilicone elastomer.

6. The press pad according to claim 1, wherein said at least one crosslinked elastomer comprises a at least one of said first blend elastomers.

7. The press pad according to claim 6, wherein said at least one first blend elastomer contains at least 10 weight percent of said fluorosilicone rubber with respect to a total weight of said first blend elastomer.

8. The press pad according to claim 1, wherein said at least one crosslinked elastomer comprises a at least one of said second blend elastomers.

9. The press pad according to claim 1, wherein said woven fabric comprises warp threads and weft threads woven together, and at least said warp threads or said weft threads include said amount of said at least one crosslinked elastomer.

10. The press pad according to claim 1, wherein said woven fabric comprises warp threads and weft threads woven together, and at least said warp threads or said weft threads include at least one metal.

11. The press pad according to claim 10, wherein at least said warp threads or said waft threads comprise threads consisting of said at least one metal.

12. The press pad according to claim 1, wherein said woven fabric comprises warp threads and weft threads woven together, and at least said warp threads or said weft threads respectively comprise a thread core consisting of a high-strength temperature-resistant yarn material, and a coating sheath that covers said core and that consists of said at least one crosslinked elastomer.

13. The press pad according to claim 12, wherein said yarn material of said thread core consists of at least one metal.

14. The press pad according to claim 13, wherein said thread core consists of a plurality of individual filaments of said at least one metal.

15. The press pad according to claim 14, wherein said at least one metal is selected from copper, brass, high-grade alloy steel, and stainless steel, wherein said filaments are strands of said metal, and wherein said core is a multi-strand core made up of said strands.

16. The press pad according to claim 12, wherein said yarn material of said thread core is a material having, a higher modulus of elasticity than said at least one crosslinked elastomer.

17. The press pad according to claim 1, wherein said woven fabric further contains a metal powder mixed into said at least one crosslinked elastomer.

18. A press pad adapted for use in high temperature pressing equipment, comprising a woven fabric that includes an amount of at least one fluoroelastomer produced by copolymerization of vinyl chloride with at least one of hexafluoropropylene tetrafluoroethylene, 1-hydropentafluoropropylene, and perfluoromethylvinylether, wherein said amount is at least 10 weight percent of a total weight of said press pad.

19. The press pad according to claim 18, wherein said at least one fluoroelastomer is produced by terpolymerization of vinyl chloride with two of hexafluoropropylene, tetrafluoroethylene, 1-hydropentafluoropropylene, and perfluoromethylvinylether.

20. A press pad for use in a hot press, consisting of a fabric that includes at least 10 weight percent of a crosslinked blend elastomer produced by crosslinking a mixture of a silicone rubber and a fluorinated rubber or a mixture of a silicone rubber and a fluorinated silicon, rubber.

* * * * *

UNITED STATES PATENT AND TRADEMARK OFFICE

CERTIFICATE OF CORRECTION

PATENT NO. : 6,737,370 B2
DATED : May 18, 2004
INVENTOR(S) : Espe

It is certified that error appears in the above-identified patent and that said Letters Patent is hereby corrected as shown below:

Title page, Item [54] and Column 1, lines 3 and 4,
Title, after "ELASTOMER" delete "PRIORITY CLAIM";

Column 4,
Line 1, "70%" should read -- 10% --;
Line 32, after "or" replace "terpolymerization" by -- ter-polymerization --;

Column 7,
Line 41, after "by" delete "a".

Signed and Sealed this

Ninth Day of November, 2004

JON W. DUDAS
*Director of the United States Patent and Trademark Office*

UNITED STATES PATENT AND TRADEMARK OFFICE

CERTIFICATE OF CORRECTION

PATENT NO. : 6,737,370 B2
APPLICATION NO. : 09/810283
DATED : May 18, 2004
INVENTOR(S) : Espe It is certified that error appears in the above-identified patent and that said Letters Patent is hereby corrected as shown below:

On the cover page,

[*] Notice: Subject to any disclaimer, the term of this patent is extended or adjusted under 35 USC 154(b) by (18) days Delete the phrase “by 18” and insert -- by 0 days--

Signed and Sealed this

Twelfth Day of December, 2006

JON W. DUDAS

*Director of the United States Patent and Trademark Office*